US007193765B2

(12) United States Patent
Christensen et al.

(10) Patent No.: US 7,193,765 B2
(45) Date of Patent: Mar. 20, 2007

(54) REDUCTION OF SPECKLE AND INTERFERENCE PATTERNS FOR LASER PROJECTORS

(75) Inventors: Robert R. Christensen, Salt Lake City, UT (US); Forrest L. Williams, Sandy, UT (US); Allen H. Tanner, Sandy, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 0 days.

(21) Appl. No.: 11/097,462

(22) Filed: Mar. 31, 2005

(65) Prior Publication Data

US 2006/0221429 A1 Oct. 5, 2006

(51) Int. Cl.
*G02F 1/01* (2006.01)

(52) U.S. Cl. .................................. 359/279
(58) Field of Classification Search ........... 359/279, 359/322, 323, 324, 240, 245, 238, 259; 349/9, 349/96; 250/225
See application file for complete search history.

(56) References Cited

U.S. PATENT DOCUMENTS

| 3,633,999 | A | 1/1972 | Buckles |
|---|---|---|---|
| 5,982,553 | A | 11/1999 | Bloom et al. |
| 6,094,267 | A * | 7/2000 | Levenson et al. ........... 356/484 |
| 6,323,984 | B1 | 11/2001 | Trisnadi |

OTHER PUBLICATIONS

Trisnadi, Jahja I., Silicon Light Machines, "speckle contrast reduction in laser projection displays" Sunnyvale, California 94089.
Corbin et al., Silicon Light Machines, "Grating light valve and vehicle displays" Sunnyvale, California.

* cited by examiner

*Primary Examiner*—Hung Dang
*Assistant Examiner*—Tuyen Tra
(74) *Attorney, Agent, or Firm*—Thorpe North & Western LLP

(57) ABSTRACT

The invention provides a system and method for reducing laser speckle and interference patterns in a laser projector display when using a laser projector having a spatial light modulator (SLM) with a defined pixel rate. The method can include the operation of polarizing a laser output of a continuous wave laser such that the laser output is s-polarized with respect to a beam combiner. The s-polarized laser output can be divided into a first laser beam and a second laser beam. A phase of the second laser beam can be modulated with an amplitude sufficient to create a phase delay of approximately half a wavelength of the laser output and at a frequency at least twice that of the SLM's pixel rate.

25 Claims, 3 Drawing Sheets

REDUCTION OF SPECKLE AND INTERFERENCE PATTERNS FOR LASER PROJECTORS

FIELD OF THE INVENTION

The present invention relates generally to the field of coherently illuminated systems. More particularly, the present invention relates to the reduction of speckle and interference patterns in laser illuminated projection systems.

BACKGROUND OF THE INVENTION

Laser speckle can be caused by interference patterns generated when coherent light illuminates a rough surface. Reflection from the rough surface can create a diffuse reflection. Transmission through the rough surface creates a diffuse transmission. When light hits a rough surface diffuse reflection and/or diffuse transmission occurs and light scatters in various directions. A laser projector uses a coherent laser beam as its light source. When the laser beam from the projector hits the display screen, the light reflects off the surface at various angles and random spatial interference of the coherent laser light with itself occurs. The resulting interference of the coherent light source causes constructive and destructive interference. To the human eye, this image artifact appears as a speckle pattern.

Diffraction can cause another image artifact to occur with laser projectors that use diffractive elements, such as the Grating Light Valve (GLV) modulator described in U.S. Pat. No. 5,982,553. Whereas speckle is caused by interference of the light scattered from the screen, the diffractive elements in the path of a laser beam can cause an interference pattern in the light incident on the screen. This pattern may be visible to the viewer as repeating dark and bright horizontal lines, and it is caused by the interference between diffracted orders after they are recombined.

Several attempts have been made to reduce the effects of laser speckle on image quality. U.S. Pat. No. 3,633,999 discloses the use of a beam splitter to separate a laser beam into two beams. The beams are recombined after the optical path length of one beam has been increased by greater than a coherence length of the laser. Because the two beams are no longer coherent, the re-combined beam can produce less speckle when it is reflected off of a surface such as a screen. However, this method is only effective for lasers that have a short coherence length. An instrument can become difficult to package as the coherence length increases.

U.S. Pat. No. 6,323,984 discloses the use of phase gratings for mitigating the effects of laser speckle on image quality of laser-based projectors that produce a two dimensional image by scanning a line image across a diffuse surface. The phase grating disclosed is a simple two-dimensional pattern consisting of a repeated arrangement of lines of phase delay. A later publication by the inventor [J I Trisnadi, "Speckle-contrast reduction in laser-projection displays," in *Projection Displays VIII*, Proc. SPIE 4657, M H Wu, Editor (Soc. Photo-Opt. Instru. Engrs., Bellingham, Wash., 2002), pp. 131–137], describes a more sophisticated configuration using so-called Hadamard matrices to achieve a greater reduction in speckle contrast. The Hadamard matrix phase grating can be vibrated to further reduce the speckle contrast by moving the phase grating relative to the line image for each scan of the projector, where the eye integrates together several sequential scans. However, use of the phase gratings can result in a loss of light when the laser beam is diffracted into higher order diffraction orders with angles that can be too great to be collected by the optics. Further, while the phase grating can reduce speckle contrast, use of phase gratings can also create objectionable interference patterns on the screen. Use of the phase gratings can merely result in trading one image artifact for another.

Finally, PCT patent application WO 01/57581 discloses a method for reducing speckle by splitting the laser beam from a laser projector into two paths and varying the optical length one of the paths using a piezoelectric transducer. By varying the optical length with an amplitude of an odd multiple of a half wavelength of the laser output, and at a frequency sufficient to be undetectable by the eye, the contrast of a single speckle pattern can be effectively reduced by up to 30% without requiring the optical path difference to be greater than the coherence length of the laser. This method can be effective in reducing laser speckle for lasers with a long coherence length. However, the method does not reduce the objectionable interference patterns that can appear in the image incident on the screen due to the diffractive elements in the projector. Further, while this method could be used with the static phase grating above, it provides no additional improvement when used with the vibrating phase grating above, since both methods must change with each scan of the projector.

SUMMARY OF THE INVENTION

The invention provides a system and method for reducing laser speckle and interference patterns in a laser projector display when using a laser projector having a spatial light modulator (SLM) with a defined pixel rate. The method can include the operation of polarizing a laser output of a continuous wave laser such that the laser output is s-polarized with respect to a beam combiner. The s-polarized laser output can be divided into a first laser beam and a second laser beam. A phase of the second laser beam can be modulated with an amplitude sufficient to create a phase delay of approximately half a wavelength of the laser output and at a frequency at least twice that of the SLM's pixel rate.

DETAILED DESCRIPTION

Figure 1:
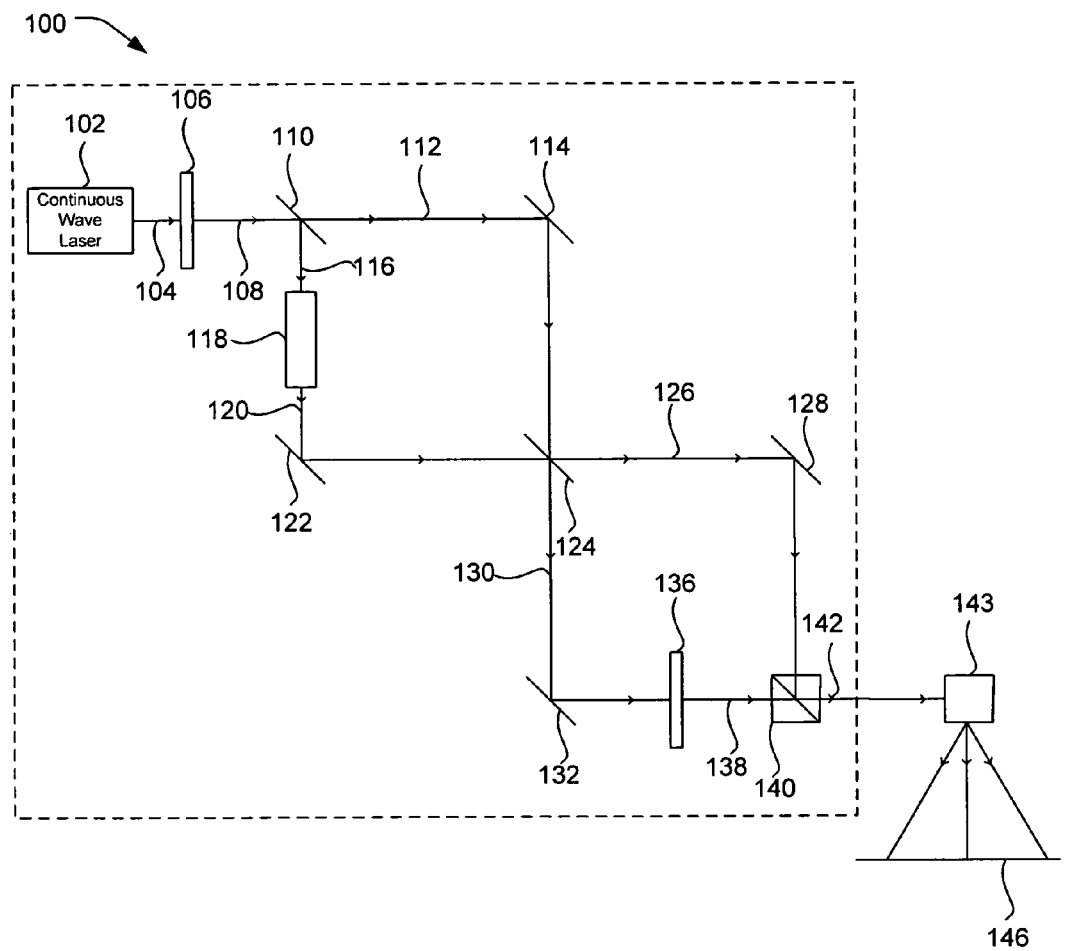
FIG. 1 is a block diagram illustrating an apparatus for reducing laser speckle and interference patterns in a laser projector display in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In order to overcome the problems described and to provide an efficient system for reducing visual obscurities in a laser projector display, the present invention provides an apparatus and method for reducing laser speckle and interference patterns in a laser projector display when using a laser projector having a spatial light modulator (SLM) with a defined pixel rate as illustrated in FIG. 1. The defined pixel rate can be any pixel rate necessary to enable a viewer to see a desired image. For example, the pixel rate may be set at a sufficient rate to reduce flicker in the image. The pixel rate may vary depending on the type of image or display which the light from the projector is being displayed on. A pixel rate sufficient to generate an image at 60 frames per second may be sufficient for one type of display. A pixel rate sufficient to generate an image at 100 frames per second may be sufficient for a second type of display.

The apparatus 100 includes a continuous wave laser 102 with a laser output 104. In one embodiment, a first half-wave plate 106 can be placed incident to the laser output 104. The first half-wave plate can be configured to polarize the laser output to produce an s-polarized laser output 108. A first polarization-independent beam splitter 110 can be placed within an optical path of the s-polarized laser output, and configured to divide the s-polarized laser output into a first laser beam 112 and a second laser beam 116, wherein the laser beams are respectively transmitted and reflected into two substantially equal orthogonal laser beams.

A phase modulator 118 can be placed within the optical path of the second laser beam 116 and configured to oscillate the phase of the second laser beam with an amplitude sufficient to create a phase delay of about half a wavelength of the laser output 104 and at a frequency at least twice that of a laser projector's pixel rate. The phase modulator may be required to oscillate the phase of the second laser beam at a frequency much greater than the laser projector's pixel rate, depending on whether there are diffractive elements used within the laser projector. In order to function at a high rate of change, the phase modulator may be an electro-optic phase modulator. This will be discussed more fully below.

A first substantially-fully reflective mirror 114 can be placed within the optical path of the first laser beam 112. The mirror can be configured to reflect the first laser beam from the first polarization-independent beam splitter 110 onto a second polarization-independent beam splitter 124. Similarly, a second substantially-fully reflective mirror 122 can be placed within the optical path of the second laser beam 116 and configured to reflect the phase modulated second laser beam 120 output from the phase modulator 118 onto the second polarization-independent beam splitter.

The second polarization-independent beam splitter 124 can be configured to transmit approximately half of the first laser beam 112 in one direction and to reflect approximately half of the first laser beam in a second direction. It is also possible for the beam splitter to transmit and reflect the first and second beams at non-orthogonal angles. The second polarization-independent beam splitter can also transmit approximately half of the phase modulated second laser beam 120 in the second direction and reflect approximately half of the phase modulated second laser beam in the first direction.

A third laser beam 126 can be formed comprising the reflected portion of the first laser beam 112 and the transmitted portion of the phase modulated second laser beam 120. A fourth laser beam 130 can be formed comprising the transmitted portion of the first laser beam and the reflected portion of the phase modulated second laser beam. Thus, the third and fourth laser beams each comprise a beam that is half modulated light and half un-modulated light.

A third substantially-fully reflective mirror 128 can be placed within the optical path of the third laser beam 126. The mirror can be configured to reflect the third laser beam from the second polarization-independent beam splitter 124 onto a beam combiner 140. Similarly, a fourth substantially-fully reflective mirror 132 can be placed within the optical path of the fourth laser beam 130. The mirror can be configured to reflect the fourth laser beam from the second polarization-independent beam splitter onto a second half wave plate 136.

The second half wave plate 136 can be configured to polarize the fourth laser beam so that the polarization of the fourth laser beam is orthogonal to the polarization of the third laser beam. It is customary in the optical field to refer to orthogonally polarized light beams as an s-polarized electric field and a p-polarized electric field. An s-polarized electric field has a polarization that is perpendicular to a plane of incidence, which is the plane defined by the incident and reflected beams. A p-polarized electric field has a polarization that is parallel to the plane of incidence. The second half wave plate can be placed within the optical path of the fourth laser beam after the beam has been reflected off the fourth substantially-fully reflective mirror 132. The p-polarized fourth laser beam 138 can be output from the second half wave plate incident on a beam combiner 140.

The beam combiner 140, as used in the present embodiment, can be polarization dependent. Thus, using the beam combiner as a plane of incidence; the third laser beam 126 can be s-polarized, a polarization that is perpendicular with respect to the beam combiner's plane of incidence. The s-polarization can be obtained by sending the laser output 104 through the first half wave plate 106, as discussed previously. The polarized fourth laser beam 138 can be p-polarized, a polarization that is parallel with respect to the beam combiner's plane of incidence. Both the s-polarized third laser beam 126 and the p-polarized fourth laser beam 138 can comprise half modulated and half un-modulated coherent light. The beam combiner can be positioned such that it is placed at the point where the third and fourth laser beams intersect, allowing the beams to be combined into a fifth laser beam 142. The fifth laser beam can comprise half modulated and half un-modulated coherent light. The fifth laser beam may be linearly polarized, circularly polarized, or elliptically polarized depending on the phase of the third and fourth laser beams as they were combined.

Splitting and then recombining the beams, as shown in FIG. 1, can reduce the contrast of the speckle pattern produced by a laser projection system on a display screen if the difference in length between the split beams is greater than the coherence length of the laser output. If the difference in length is less than the coherence length of the laser output, as in the present embodiment, then the two beams will still be coherent when they are recombined. The laser projector display screen 122 can consist of scattering centers that send the coherent light from the laser projector in different directions. Due to the height variations of these scattering centers, the light that reaches the viewers eye from adjacent points will have different path lengths. The light from the screen that combines to form the viewer's smallest resolvable spot will interfere and can create bright or dark speckles or any intensity in between, as discussed previously.

In the present embodiment, the recombined beams will present a new speckle pattern to a viewer looking at the screen since the phase of approximately half of the light has been changed. Although the new speckle pattern will be different than the original single beam speckle pattern, the amount of speckle, or the speckle contrast, will remain the same if the difference in length between the split beams is less than the coherence length of the laser output.

To decrease the speckle contrast, the phase modulator may change the phase of one of the beams, in this embodiment the second laser beam 116, at a high frequency. The peak-to-peak amplitude of the modulator should produce approximately 180 degrees of phase delay, which corresponds to a change in the optical path length of approximately half a wavelength. The frequency should be at least twice the projector's pixel rate. By modulating the phase at a frequency of at least twice the projector's pixel rate, each scattering center on the screen is exposed to at least two cycles of constructive and destructive interference between the two beams for each pixel. The high frequency phase modulation is much faster than the eye's response time, so the varying intensities will be averaged together in the eye. Thus, modulating the phase can effectively create two different speckle patterns.

It is well known in the art that speckle can be reduced by superimposing N uncorrelated speckle patterns. This can reduce the contrast of the speckle on the display screen by, at most, $1/\sqrt{N}$. Thus, the use of a high frequency phase modulator to create two uncorrelated speckle patterns can reduce the speckle contrast from 100% to $1/\sqrt{2}$, or about 70%. In order to create a greater change in contrast, a greater number of uncorrelated speckle patterns must be created.

A spatial light modulator (SLM) 143 can be placed within the optical path of the fifth laser beam 142 and configured to scan the polarization rotated beam onto a screen 146. The fifth laser beam can be scanned at a rate that would allow a viewer to view the entire image without any noticeable irregularities caused by the scanning. This can typically be achieved with a scan rate of approximately 60 Hz or greater. The spatial light modulator can be an electro-optic SLM, a photoconductor-liquid crystal SLM, or a photoconductor-deformable mirror SLM. For example, in one embodiment the SLM can be a grating light valve (GLV). The GLV can be used to scan the fifth laser beam onto the screen.

Figure 2:
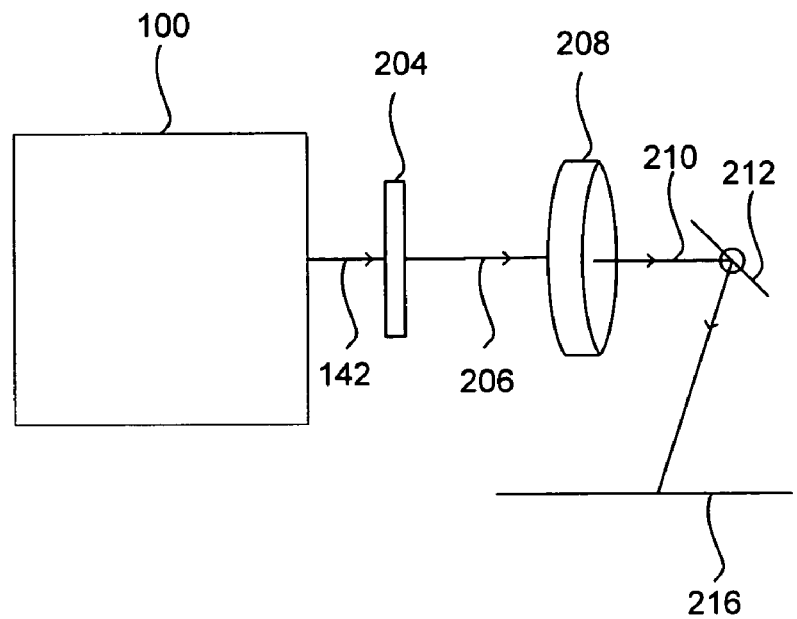
FIG. 2 is a block diagram illustrating an embodiment of the present invention combining the apparatus of FIG. 1 with the further use of a quarter wave plate and polarization rotator.

In a second embodiment, the phase modulated light from the apparatus 100 in FIG. 1 can be combined with a high-frequency polarization rotator 208, as shown in FIG. 2. A quarter wave plate 204 can be placed in the optical path of the fifth laser beam 142. The polarization of the fifth laser beam depends on the phase of the third laser beam 126 and the fourth laser beam 138 when they are combined. The quarter wave plate can be configured to shift the phase of the s and p-polarizations in the fifth laser beam into a coherent, linearly polarized beam. Alternatively, the quarter wave plate can be configured to produce an elliptical polarization of the fifth laser beam. The high-frequency polarization rotator can be placed in the optical path of the polarized laser beam 206 output from the quarter wave plate. The polarization rotator can be configured to rotate at twice the phase modulator's 118 (FIG. 1) frequency or faster. In order to function at a high rate of change, the phase modulator may be an electro-optic phase modulator. By rotating the polarization of the linearly polarized beam, the speckle patterns from the s and p-polarizations will not interfere with each other after the depolarizing screen because they are presented sequentially. This can create two additional uncorrelated speckle patterns, reducing the speckle contrast by an additional 30%.

A scanning mirror 212 (or SLM) can be placed within the optical path of the polarization rotated beam 210 and configured to scan the polarization rotated beam onto a screen 216. The polarization rotated beam can be scanned at a rate that would allow a viewer to view the entire image without any noticeable irregularities caused by the scanning. This can be achieved with a scan rate of approximately 60 Hz or greater. The screen can be a depolarizing screen. A depolarizing screen can create two independent speckle patterns from a linearly polarized beam, reducing the speckle by an additional 30%.

The first and second embodiments can also be used in conjunction with a moving phase grating or diffuser (not shown) by varying the optical path length at twice the frequency of the phase grating cells, or faster. For example, a phase grating cell can be the size of ⅛ of a pixel. The phase grating matrix can comprise 8 cells per pixel. If the maximum pixel rate is approximately a pixel displayed for 1/10,000 of the scan, and the laser projector is operated at a scan rate of 60 Hz, the oscillation frequency of the optical path length can be varied at:

$$60\frac{\text{scans}}{\text{sec}} \times 10,000\frac{\text{pixels}}{\text{scan}} \times 8\frac{\text{cells}}{\text{pixel}} \times 1\frac{\text{cycle}}{\text{cell}} \times 2 = 9.6 \text{ MHz}$$

Thus, in order to reduce speckle when using a phase grating in the setup above, the optical path should be varied at a frequency of at least 9.6 MHz with an amplitude of approximately half a wavelength (or an odd multiple of half a wavelength) of the laser output 104.

In this example, the phase grating can present eight speckle patterns per scan of the projector, reducing the speckle by $1/\sqrt{8}$. By moving the phase grating for every scan of the projector, eight different speckle patterns are presented for each scan. Assuming that the human eye's integration time, the time it takes for the eye to detect a change, is approximately 50 ms, a projector scanning at 60 Hz can pass three scans within the integration time of the eye. So the phase grating can create $1/\sqrt{3\times8}=1/\sqrt{24}$ speckle reduction. Varying the optical path at a sufficient frequency can create a maximum and a minimum in each cycle for each cell so there are two path lengths per diffuser cell. With two path lengths per diffuser cell the number of speckle patterns is doubled, decreasing the speckle contrast to $$1/\sqrt{2\times24} = 1/\sqrt{48} = 0.144$$

of the original speckle contrast. Thus, the speckle contrast can be reduced by up to an additional 85.6%.

In addition to reducing speckle contrast, the present invention can reduce the contrast of interference lines that may appear on the screen. As discussed, interference lines can be caused by the use of diffractive elements, such as a GLV or a phase grating. The present invention can reduce the interference contrast on the screen by changing the path length of two orthogonal polarizations. By varying the path length of half of the s-polarization and half of the p-polarization, the interference lines can change at a high frequency between two states and be integrated by the eye to show less contrast.

Figure 3:
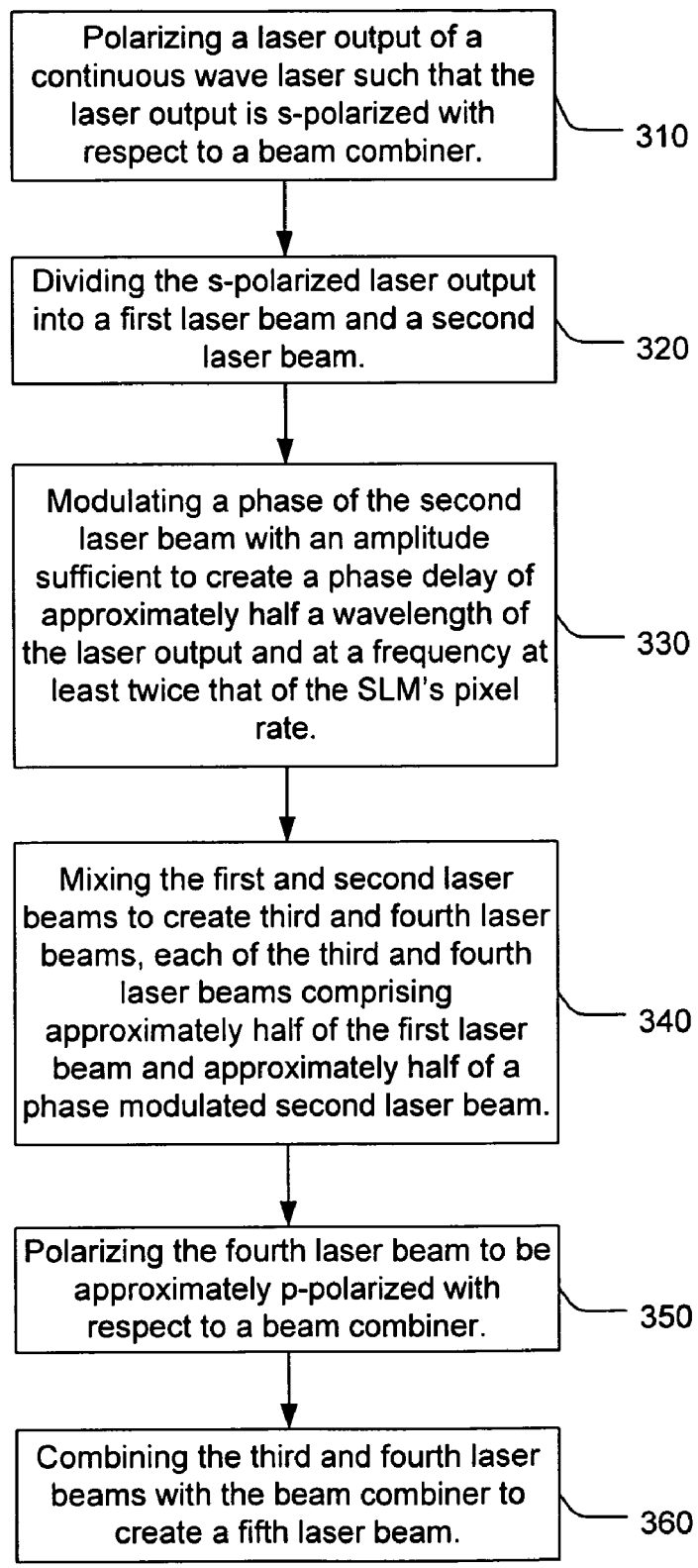
FIG. 3 is a flow chart depicting a method for reducing laser speckle and interference patterns in a laser projector display in accordance with an embodiment of the present invention.

Another embodiment of the invention provides a method for reducing laser speckle and interference patterns in a laser projector display when using a spatial light modulator (SLM) having a defined pixel rate as depicted in the flow chart of FIG. 3. The method includes the operation of polarizing a laser output of a continuous wave laser such that the laser output is s-polarized with respect to a beam combiner, as illustrated in block 310. A further operation includes dividing the s-polarized laser output into a first laser beam and a second laser beam, as illustrated in block 320. Another operation involves modulating a phase of the second laser beam with an amplitude sufficient to create a phase delay of approximately half a wavelength of the laser output and at a frequency at least twice that of the SLM's pixel rate, as illustrated in block 330. The phase modulator used in this operation can be an electro-optic phase modulator.

A further operation includes mixing the first and second laser beams to create third and fourth laser beams, each of the third and fourth laser beams comprising approximately half of the first laser beam and approximately half of a phase modulated second laser beam, as illustrated in block 340. Mixing, as used in this instance, can be accomplished using a semi-transparent mirror to transmit approximately half and reflect approximately half of each of the first and second laser beams to create third and fourth laser beams. Another operation involves polarizing the fourth laser beam to be approximately p-polarized with respect to a beam combiner, as illustrated in block 350. A further step includes combining the third and fourth laser beams with the beam combiner to create a fifth laser beam, as illustrated in block 360. A scanning mirror can be placed in the optical path of the fifth laser beam and used to scan an image on a display screen. An SLM may be used in place of the scanning mirror. The image may be scanned at a frequency that allows a viewer to integrate the scanning into a whole image. For example, the image may be scanned at a rate of 60 Hz. The display screen may be a depolarizing screen.

The invention herein described overcomes the problems of the prior art and provides an efficient apparatus and method for reducing visual anomalies from display screens when laser projectors are used. In particular, the present invention can reduce both speckle and interference patterns in a laser projector that uses a laser with a relatively long coherence length. Further, the present apparatus and method can reduce speckle by 85% or more by using a high frequency phase modulator to vary an optical path length and a phase grating. The combination of the high frequency phase modulator with the phase grating diffuser allows for further speckle reduction than can be presently achieved in the art, while also reducing the visibility of interference patterns present in the art.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. An apparatus for reducing laser speckle and interference patterns in a laser projector display, when using a laser projector having a spatial light modulator (SLM) with a defined pixel rate, comprising:
    a continuous wave laser having a laser output defining an optical path to be split into multiple optical paths;
    a beam combiner positioned optically down field from the continuous wave laser for recombining the multiple optical paths;
    a first half wave plate placed in an optical path incident to the laser output and configured to polarize the laser output to be s-polarized with respect to the beam combiner;
    a first polarization-independent beam splitter optically positioned and configured to divide the laser output of the continuous wave laser into a first laser beam and a second laser beam;
    a phase modulator optically positioned and configured to oscillate a phase of the second laser beam with an amplitude sufficient to create a phase delay of an odd integer multiple of approximately half a wavelength of the laser output and at a frequency at least twice that of the pixel rate of the SLM;
    a second polarization-independent beam splitter optically positioned and configured to reflect approximately half of the first laser beam and half of a phase modulated second laser beam and to transmit approximately half of the first laser beam and half of the phase modulated second laser beam to produce third and fourth laser beams, each of the third and fourth laser beams comprising approximately half of the first laser beam and approximately half of the phase modulated second laser beam;
    a second half wave plate optically positioned and configured to polarize the fourth laser beam to be p-polarized with respect to the beam combiner; and
    the beam combiner configured to combine the s-polarized third laser beam and the p-polarized fourth laser beam into a fifth laser beam.

2. An apparatus as in claim 1, wherein the s-polarized third laser beam and the p-polarized fourth laser beam are combined to form a linearly polarized fifth laser beam.

3. An apparatus as in claim 1, wherein the s-polarized third laser beam and the p-polarized fourth laser beam are combined to form an elliptically polarized fifth laser beam.

4. An apparatus as in claim 1, further comprising a first substantially fully reflective mirror configured to redirect the first laser beam output from the first polarization-independent beam splitter onto the second polarization-independent beam splitter.

5. An apparatus as in claim 1, further comprising a second substantially fully reflective mirror configured to redirect the second laser beam as output from the phase modulator onto the second polarization-independent beam splitter.

6. An apparatus as in claim 1, wherein the first polarization-independent beam splitter is a partially reflective mirror configured to transmit approximately half of the laser output and reflect approximately half of the laser output.

7. An apparatus as in claim 6, wherein the first laser beam comprises the approximately half of the laser output that is transmitted.

8. An apparatus as in claim 6, wherein the second laser beam comprises the approximately half of the laser output that is reflected.

9. An apparatus as in claim 1, wherein the second polarization-independent beam splitter is a partially reflective mirror that transmits approximately half of the first laser beam and reflects approximately half of the first laser beam and transmits approximately half of the phase modulated second laser beam and reflects approximately half of the phase modulated second laser beam.

10. An apparatus as in claim 9, wherein the third laser beam comprises the approximately half of the reflected first laser beam and the approximately half of the transmitted phase modulated second laser beam.

11. An apparatus as in claim 9, wherein the fourth laser beam comprises the approximately half of the transmitted first laser beam and the approximately half of the reflected phase modulated second laser beam.

12. An apparatus as in claim 1, further comprising a third substantially fully reflective mirror configured to redirect the third laser beam from the second polarization-independent beam splitter onto the beam combiner.

13. An apparatus as in claim 1, further comprising a fourth substantially fully reflective mirror configured to redirect the fourth laser beam from the second polarization-independent beam splitter through the second half wave plate and onto the beam combiner.

14. An apparatus as in claim 1, wherein the phase modulator is an electro-optic phase modulator.

15. An apparatus as in claim 1, wherein the phase modulator is configured to oscillate the second laser beam at an amplitude of at least a half wavelength of the laser output.

16. An apparatus as in claim 1, wherein the phase modulator is configured to oscillate the second laser beam with a frequency of at least 4 times the pixel rate.

17. An apparatus as in claim 1, further comprising a scanning mirror configured to substantially reflect the fifth laser beam onto a viewing screen.

18. An apparatus for reducing laser speckle and interference fringes, comprising:
  a continuous wave laser having a laser output defining an optical path to be split into multiple optical paths;
  a spatial light modulator (SLM) optically coupled to the continuous wave laser, wherein the SLM has a defined pixel rate;
  a beam combiner positioned optically down field from the continuous wave laser for recombining the multiple optical paths;
  a first half wave plate placed in an optical path incident to the laser output and configured to polarize the laser output to be s-polarized with respect to the beam combiner;
  a first polarization-independent beam splitter optically positioned and configured to divide the laser output of the continuous wave laser into a first laser beam and a second laser beam;
  a phase modulator optically positioned and configured to oscillate a phase of the second laser beam with an amplitude sufficient to create a phase delay of an odd integer multiple of approximately half a wavelength of the laser output and at a frequency at least twice that of the pixel rate of the SLM;
  a second polarization-independent beam splitter optically positioned and configured to reflect approximately half of the first laser beam and half of a phase modulated second laser beam and to transmit approximately half of the first laser beam and half of the phase modulated second laser beam to produce third and fourth laser beams, each of the third and fourth laser beams comprising approximately half of the first laser beam and approximately half of the phase modulated second laser beam;
  a second half wave plate optically positioned and configured to polarize the fourth laser beam to be p-polarized with respect to the beam combiner;
  the beam combiner configured to combine the s-polarized third laser beam and the p-polarized fourth laser beam into a fifth laser beam;
  a quarter wave plate optically positioned and configured to substantially linearly polarize the fifth laser beam; and
  a polarization rotator optically positioned and configured to rotate a polarization of the substantially linearly polarized fifth laser beam.

19. An apparatus as in claim 18, wherein the SLM is selected from the group of spatial light modulators consisting of electro-optic; photoconductor-liquid crystal, and photoconductor-deformable mirror.

20. An apparatus as in claim 18, wherein the polarization rotator is an electro-optic polarization rotator.

21. An apparatus as in claim 18, wherein the polarization rotator is configured to rotate the polarization of the fifth laser beam at a frequency of at least twice a rate of the phase modulator.

22. An apparatus as in claim 18, further comprising a scanning mirror configured to substantially reflect a polarization rotated beam onto a screen.

23. An apparatus as in claim 22, wherein the screen is a depolarizing screen.

24. A method for reducing laser speckle and interference patterns in a laser projector display, when using a laser projector having a spatial light modulator (SLM) with a defined pixel rate, comprising:
  polarizing a laser output of a continuous wave laser such that the laser output is s-polarized with respect to a beam combiner;
  dividing the s-polarized laser output into a first laser beam and a second laser beam;
  modulating a phase of the second laser beam with an amplitude sufficient to create a phase delay of approximately half a wavelength of the laser output and at a frequency at least twice that of the SLM's pixel rate;
  mixing the first laser beam and the phase-modulated second laser beam to create third and fourth laser beams, each of the third and fourth laser beams comprising approximately half of the first laser beam and approximately half of the phase modulated second laser beam;
  polarizing the fourth laser beam to be approximately p-polarized with respect to the beam combiner; and
  combining the s-polarized third and p-polarized fourth laser beams with the beam combiner to create a fifth laser beam.

25. A means for reducing laser speckle and interference patterns in a laser projector display, when using a laser projector having a spatial light modulator (SLM) with a defined pixel rate, comprising:
  a means for polarizing a laser output of a continuous wave laser such that the laser output is s-polarized with respect to a beam combiner;
  a means for dividing the s-polarized laser output into a first laser beam and a second laser beam;
  a means for modulating a phase of the second laser beam with an amplitude sufficient to create a phase delay of approximately half a wavelength of the laser output and at a frequency at least twice that of the SLM's pixel rate;
  a means for mixing the first and second laser beams to create third and fourth laser beams, each of the third and fourth laser beams comprising approximately half of the first laser beam and approximately half of a phase modulated second laser beam;
  a means for polarizing the fourth laser beam to be approximately p-polarized with respect to the beam combiner; and
  a means for combining the s-polarized third and p-polarized fourth laser beams with the beam combiner to create a fifth laser beam.

* * * * *